March 20, 1962 H. MEIGEL ETAL 3,026,376

TELEPHONE SYSTEM COMPRISING SELECTORS CONTROLLED BY CONTROL DEVICES COMMON THERETO

Filed July 14, 1959 8 Sheets-Sheet 1

Inventors.
Helmut Meigel,
Kurt Laas, &
Wolfgang Papke.
By [signature] Atty.

Inventors.
Helmut Meigel.
Kurt Laas, &
Wolfgang Papke.
By. [signature] Atty

March 20, 1962 H. MEIGEL ETAL 3,026,376

TELEPHONE SYSTEM COMPRISING SELECTORS CONTROLLED BY CONTROL DEVICES COMMON THERETO

Filed July 14, 1959 8 Sheets-Sheet 3

Inventors.
Helmut Meigel
Kurt Laas, &
Wolfgang Papke
By
Atty.

Inventors
Helmut Meigel,
Kurt Haas, &
Wolfgang Papke,
By [signature] Atty.

Inventors.
Helmut Meigel.
Kurt Laas, 6,
Wolfgang Papke.
By. [signature] Atty.

Inventors.
Helmut Meigel,
Kurt Laas, &
Wolfgang Papke.
By [signature] Atty.

March 20, 1962 H. MEIGEL ET AL 3,026,376

TELEPHONE SYSTEM COMPRISING SELECTORS CONTROLLED BY CONTROL DEVICES COMMON THERETO

Filed July 14, 1959 8 Sheets-Sheet 7

Inventors.
Helmut Meigel,
Kurt Laas, &
Wolfgang Papke.
By [signature] Atty.

March 20, 1962 H. MEIGEL ETAL 3,026,376

TELEPHONE SYSTEM COMPRISING SELECTORS CONTROLLED BY CONTROL DEVICES COMMON THERETO

Filed July 14, 1959 8 Sheets-Sheet 8

Inventors.
Helmut Meigel,
Kurt Laas, &
Wolfgang Papke,
By [signature] Atty.

3,026,376

TELEPHONE SYSTEM COMPRISING SELECTORS CONTROLLED BY CONTROL DEVICES COMMON THERETO

Helmut Meigel, Kurt Laas, and Wolfgang Papke, Munich, Germany, assignors to Siemens & Halske Aktiengesellschaft Berlin and Munich, a corporation of Germany
Filed July 14, 1959, Ser. No. 827,109
Claims priority, application Germany July 18, 1958
8 Claims. (Cl. 179—18)

Figures 1, 6:
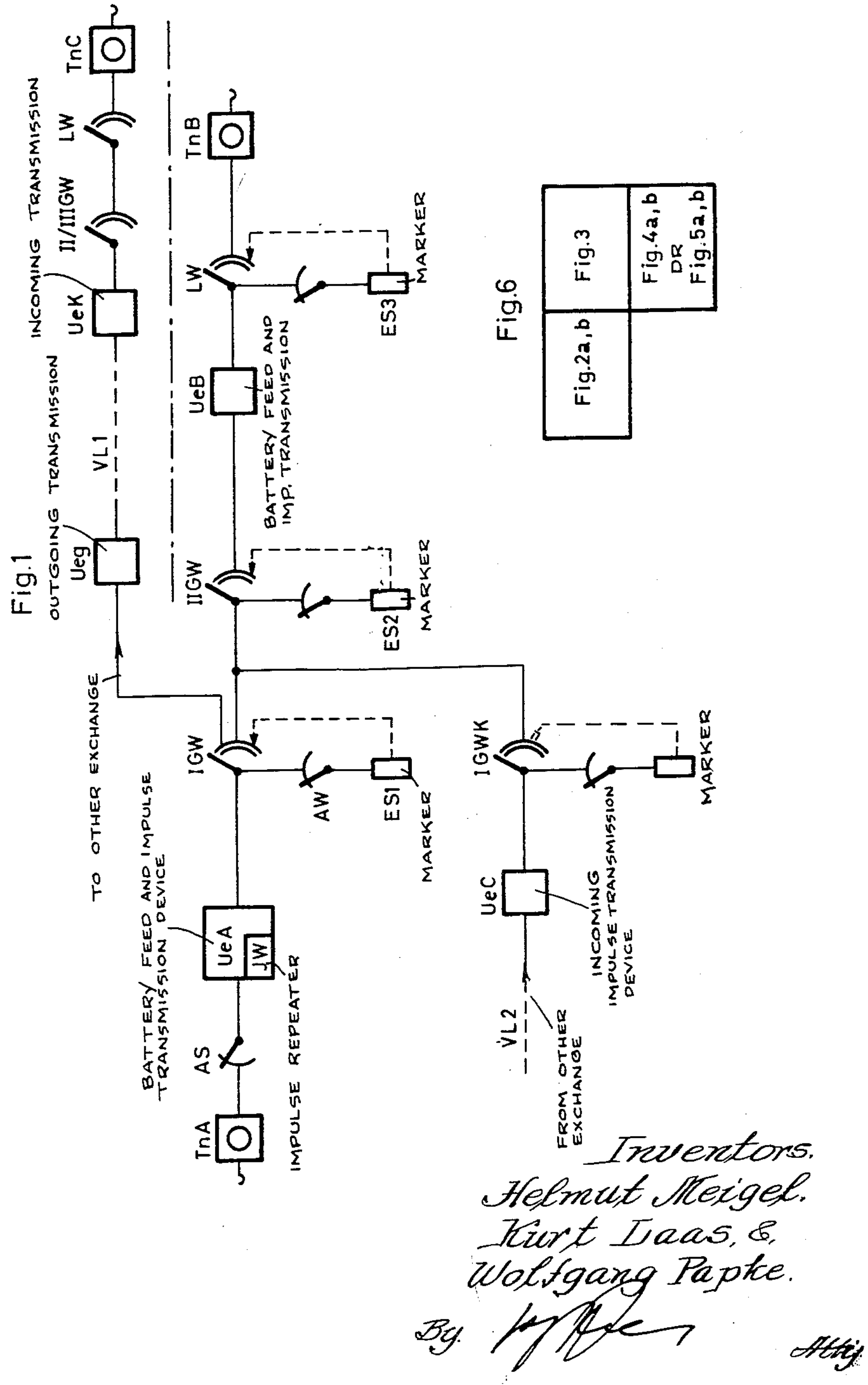

This invention is concerned with a telephone system having a circuit arrangement comprising selectors disposed in the various selection stages, which are governed by marker devices respectively common to a plurality of selectors in given selection stages.

The marker devices receive in known manner series of impulses corresponding to called subscriber stations, convert such impulses by counting chain means into the marker potential designation associated with predetermined marker lines, and thereupon cause the selectors involved in the extension of a call to be respectively connected with the corresponding marked line. The selectors are preferably rotary selectors with individual drive, for example, motor-driven rotary selectors; however, the invention may also be employed in connection with other selectors, for example, in connection with vertical-rotary stepping selectors or relay selectors.

In a system with uniform marking number scheme, also referred to as concealing marking number scheme or plan, in which subscribers are invariably reached by the same number or digit regardless of the exchange from which a call is extended, the switching-over of connections to the so-called internal traffic, wherein calls which are to be fully automatically extended are not directed to another exchange but remain in a local exchange, may be effected by special switch-over switches or by causing the group selectors, preferably the first group selectors, to absorb or to suppress predetermined impulse series, that is, the setting of such selectors is not effected by the impulse series which is to be suppressed, or such setting is cancelled again. Individual digits or the selection impulse series corresponding thereto are thereby either repeatedly suppressed or other digits are absorbed only once, that is, digits following that which is to be suppressed, are made effective. Other digits are not absorbed but are utilized for the definite setting of the selectors. The invention is concerned with the last noted technique.

The direct suppression of digits or selection impulse series, that is, directly in the selector which is being controlled by impulse series, is known. Switching means such as decade contacts or coacting switches are for this purpose provided for the corresponding selectors. In order to obtain circuits as simple as possible the discriminating means for determining whether digits are or are not to be suppressed, are placed in the common marker where they prevent unnecessary operative actuation of a selector when selection impulse series are to be suppressed. In accordance with an object of the invention, starting relays of the selectors are disposed in the marker, the starting relays of a seized selector being at the conclusion of each received selection impulse series connected to a supervising circuit extending from the marker to a preceding transmission device of the connection path over which the corresponding selector had been seized, whereby the corresponding starting relays can upon receipt of selection impulse series become effective over the supervising circuit, for the setting of the corresponding selector, only after switching means of the supervising circuit of the transmission device has become operative, triggered by the marking potential by way of branches of the marker lines which extend in parallel to the supervising circuit, to effect a change of potential in the supervising circuit to which the starting relays of the selector can operatively respond.

In accordance with another feature of the invention, the supervising relay of the transmission device, which had been triggered by the marking potential, disconnects itself from the supervising circuit while the triggering criterion is being locally stored, at the same time connecting to the supervising circuit a potential which is opposed to the triggering potential.

According to a further feature of the invention, the marker line branches corresponding to the digits which are not to be suppressed as well as the starting relays of the selector which are disposed in the marker, are at the conclusion of the corresponding selection impulse series simultaneously connected to the supervising circuit, thereby effecting energization, by way of the supervising circuit to the preceding transmission, first of the supervising relay in the transmission device and thereafter of the starting relays, after the latter have ascertained the corresponding potential by reversal of polarization. However, the marker line branches corresponding to digits which are to be suppressed only once, are connected to the supervising circuit at the conclusion of the corresponding selection impulse series with simultaneous disconnection of the starting relays from the supervising circuit, the marker potential thus effecting at that time only the energization of the supervising relay to the transmission device, such supervising relay preparatorily connecting the triggering potential for the starting relays, by reversal of polarity, to the supervising line, so that the starting relays can be energized which are connected to the supervising circuit only at the conclusion of the next selection impulse series. The marker line branches corresponding to digits which are to be suppressed repeatedly are not connected to the supervising circuit at the end of the corresponding selection impulse series, thus preventing energization of the starting relays of the selector responsive to these impulse series.

According to another feature of the invention, various predetermined combinations (programs) of digits to be respectively suppressed and not suppressed can be designated in the marker by way of a switching member, for example, a wiper of a switch provided for interconnecting the marker with the connection path. This feature can be advantageous in connection with incoming calls since the different routes require different digit suppression programs. These different programs are then separated in the marker by way of a wiper of the interconnecting switch.

The various objects and features of the invention will appear from the description which will be rendered below with reference to the accompanying drawings, wherein—

Figure 2A:
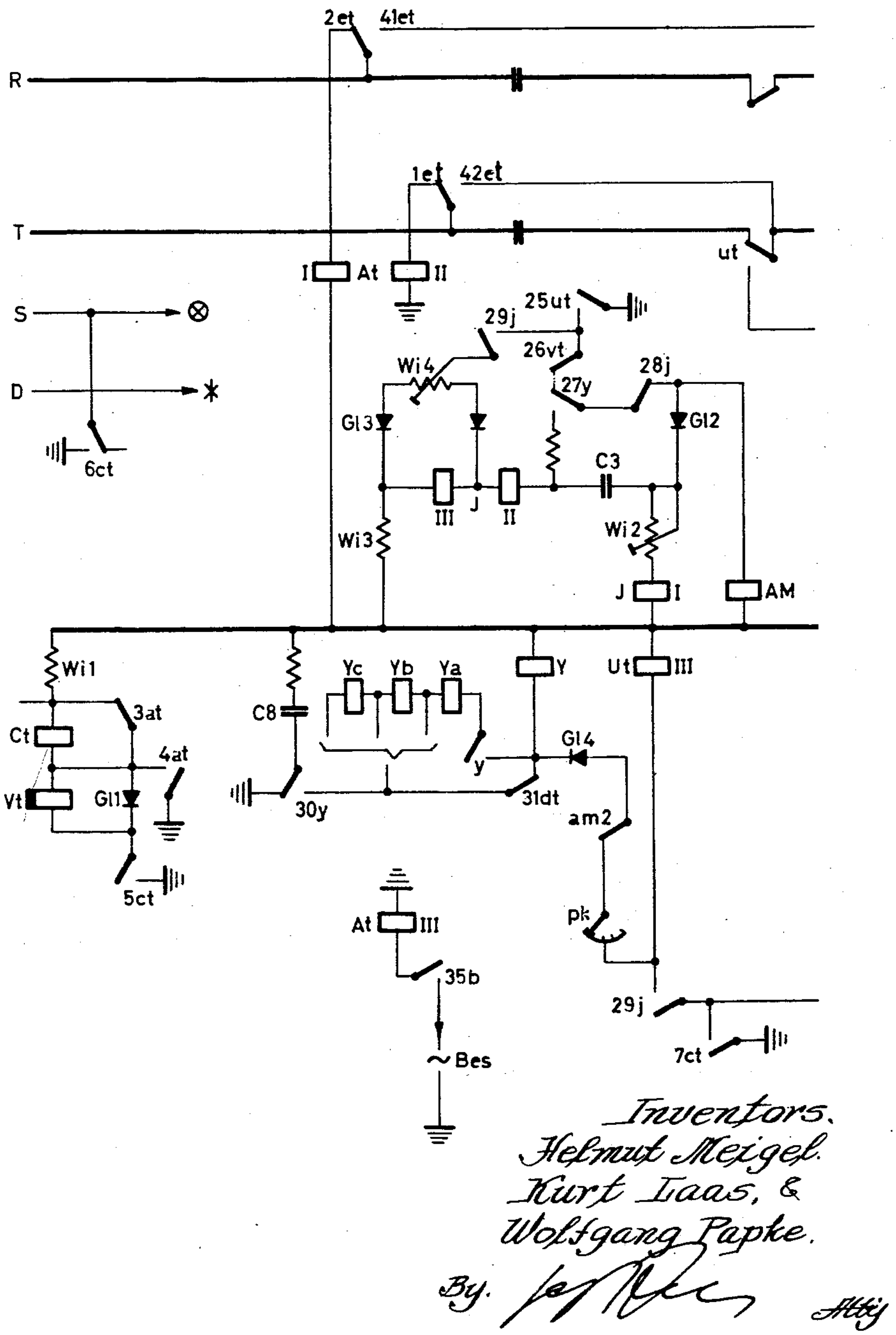
Figure 2B:
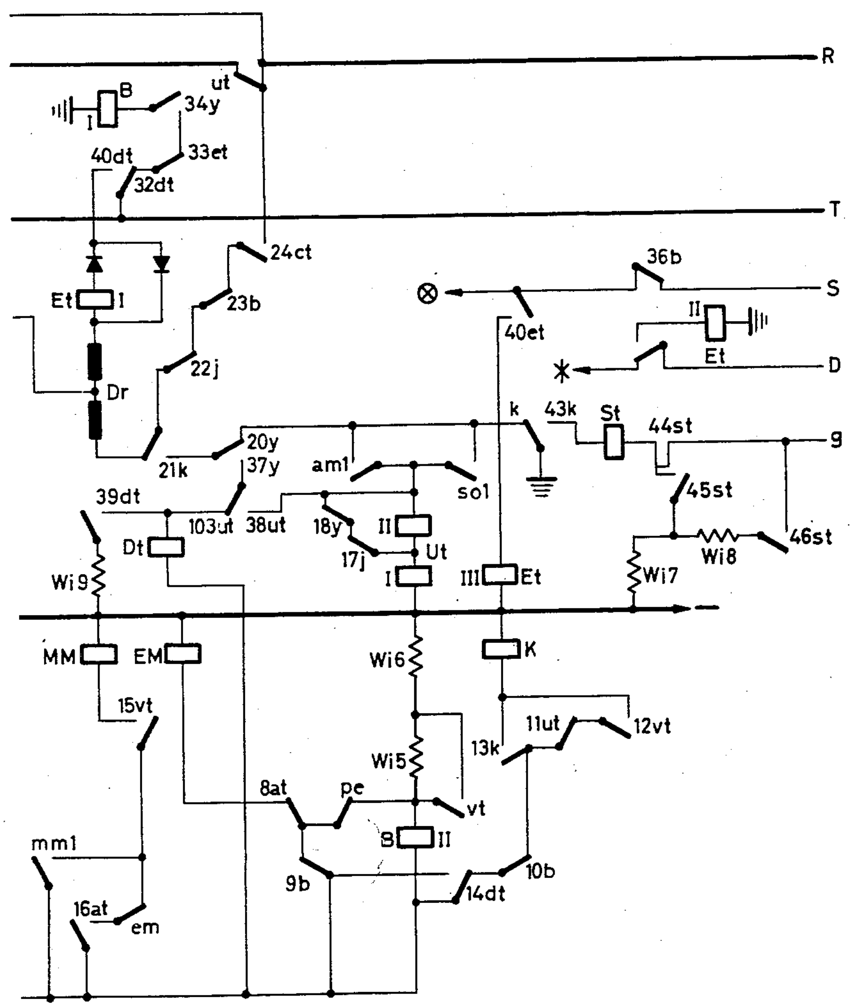
Figure 3:
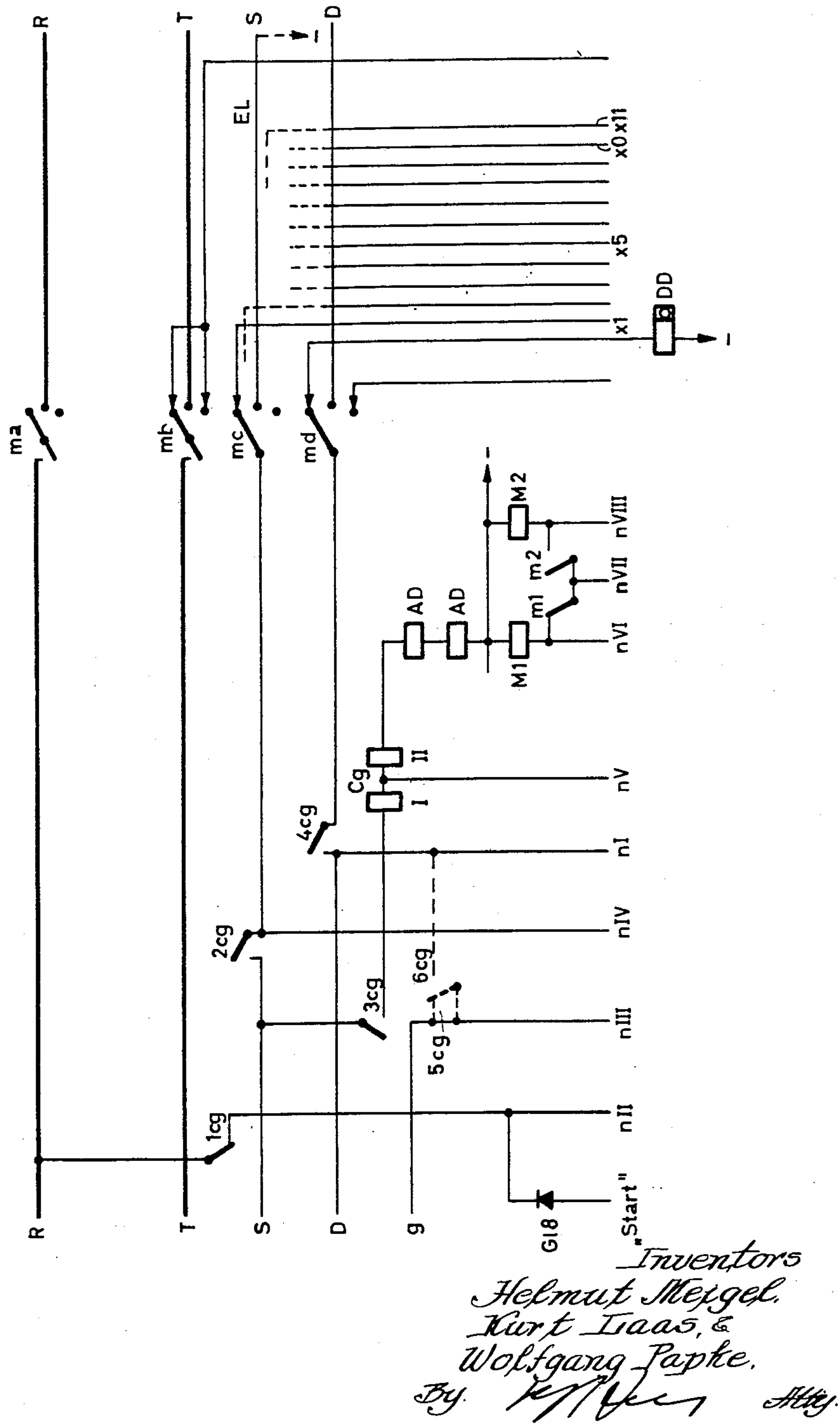
Figure 4A:
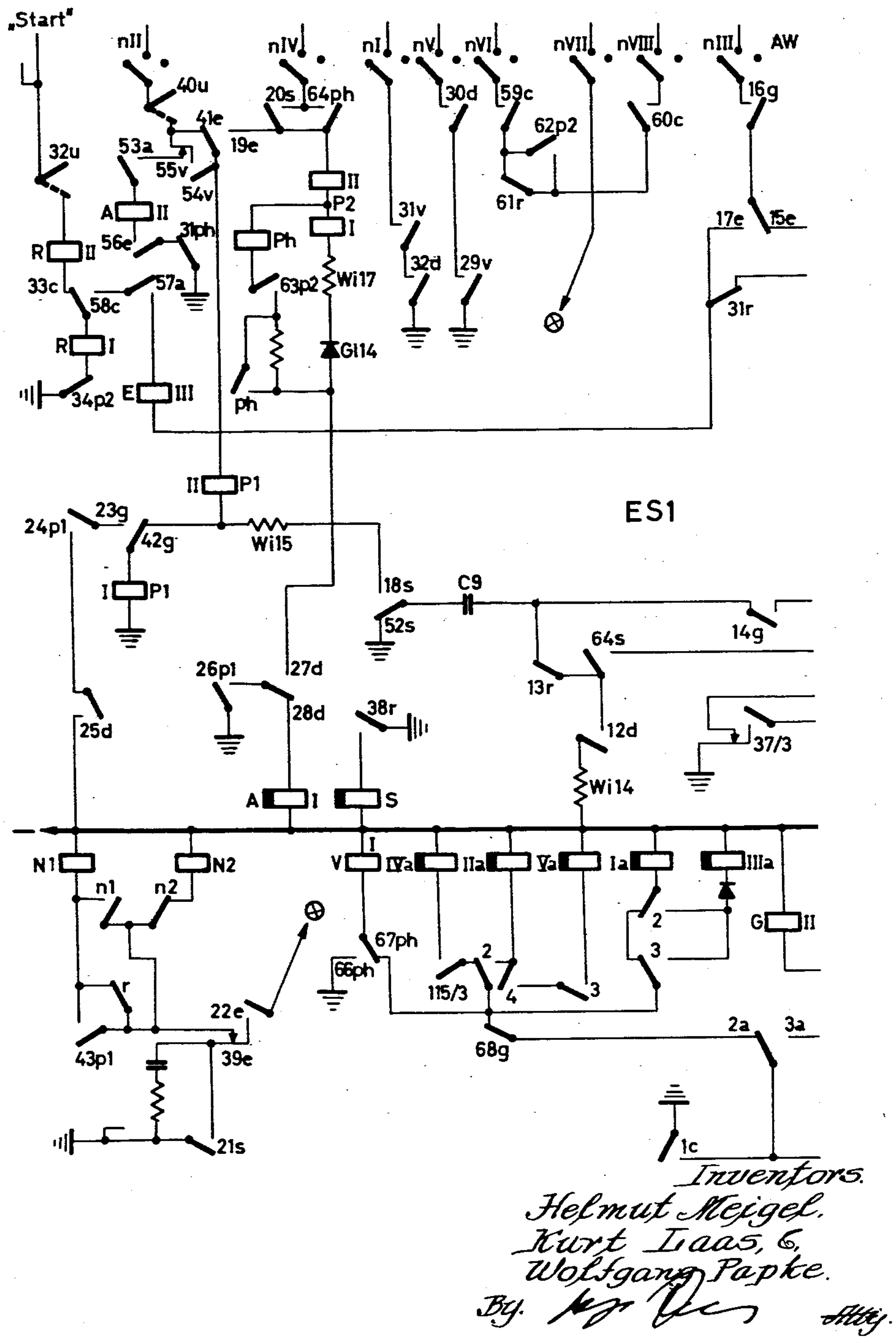
Figure 4B:
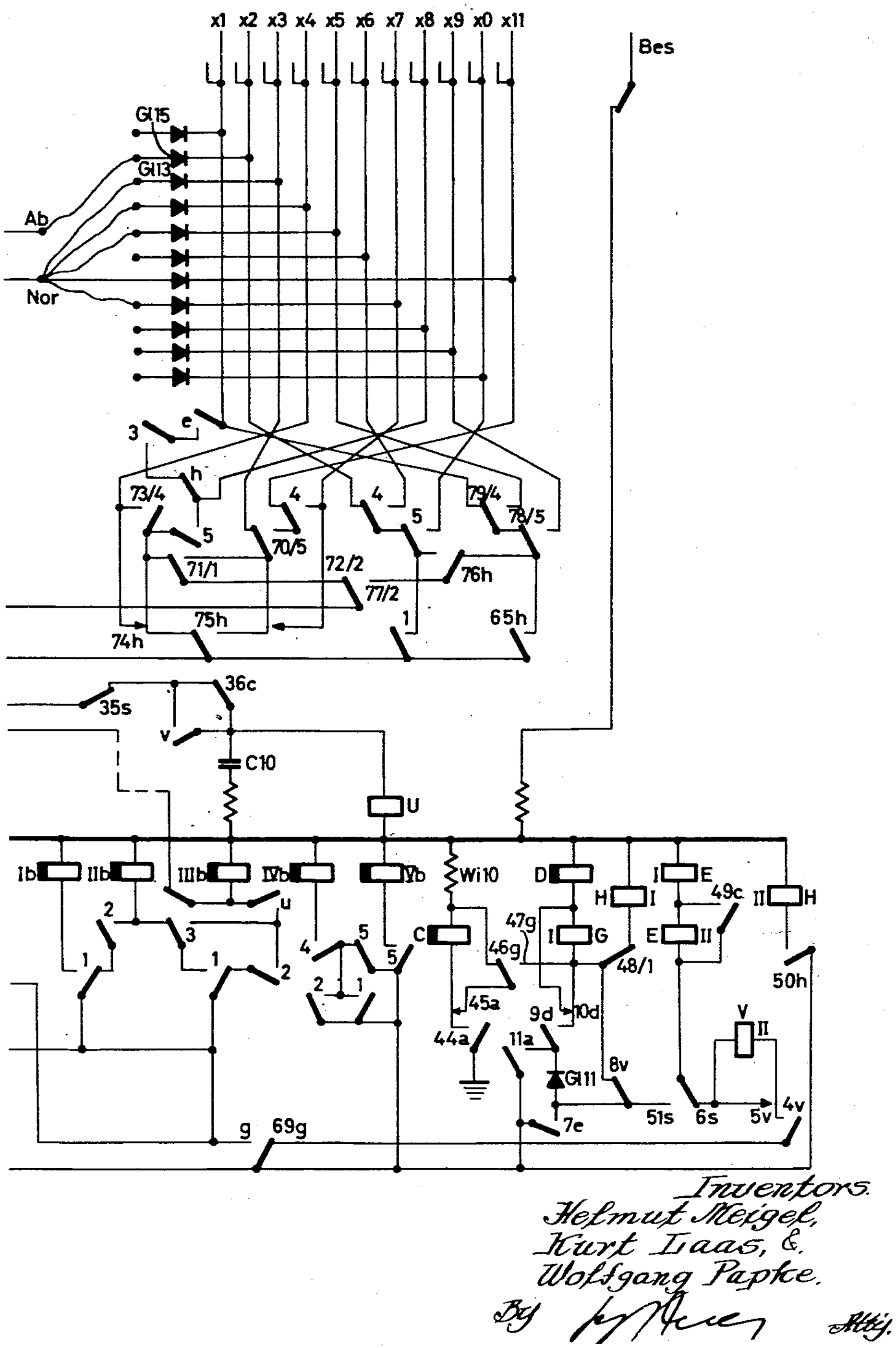
Figure 5A:
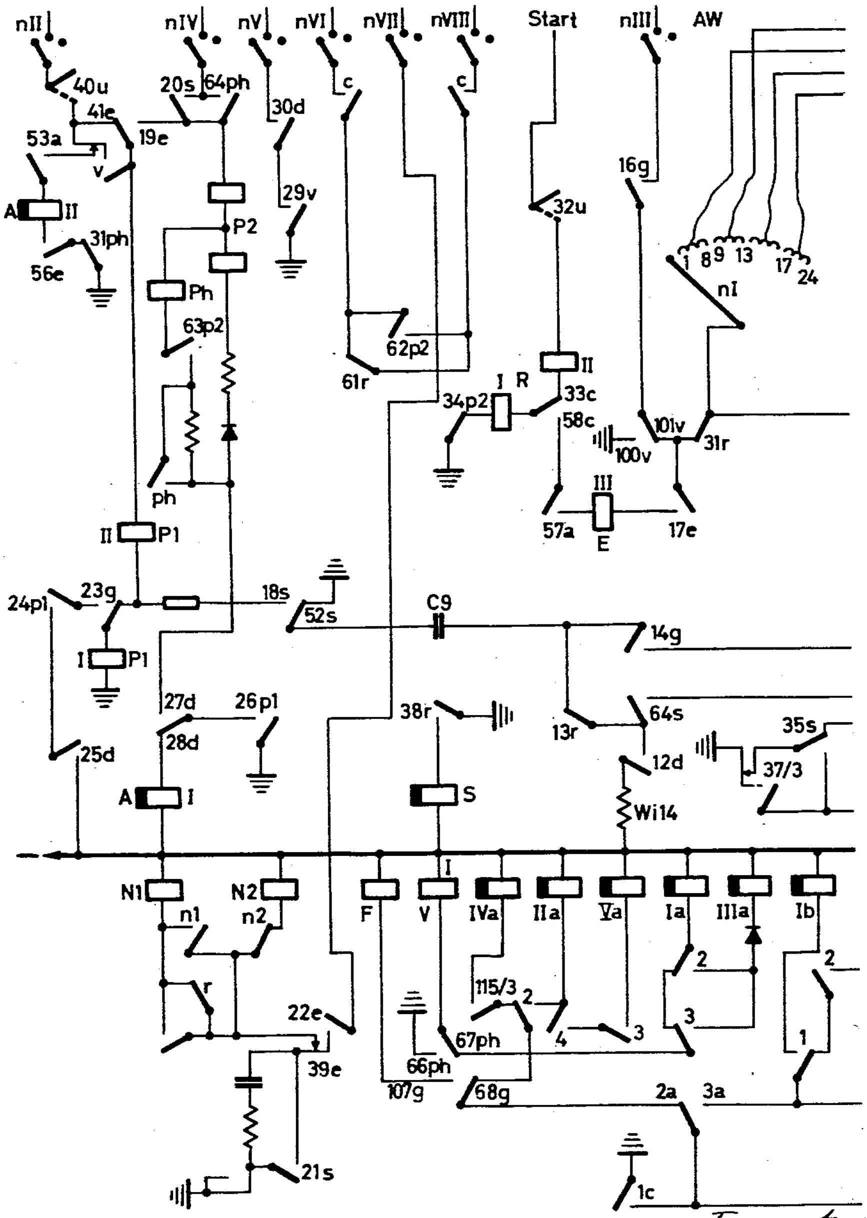
Figure 5B:
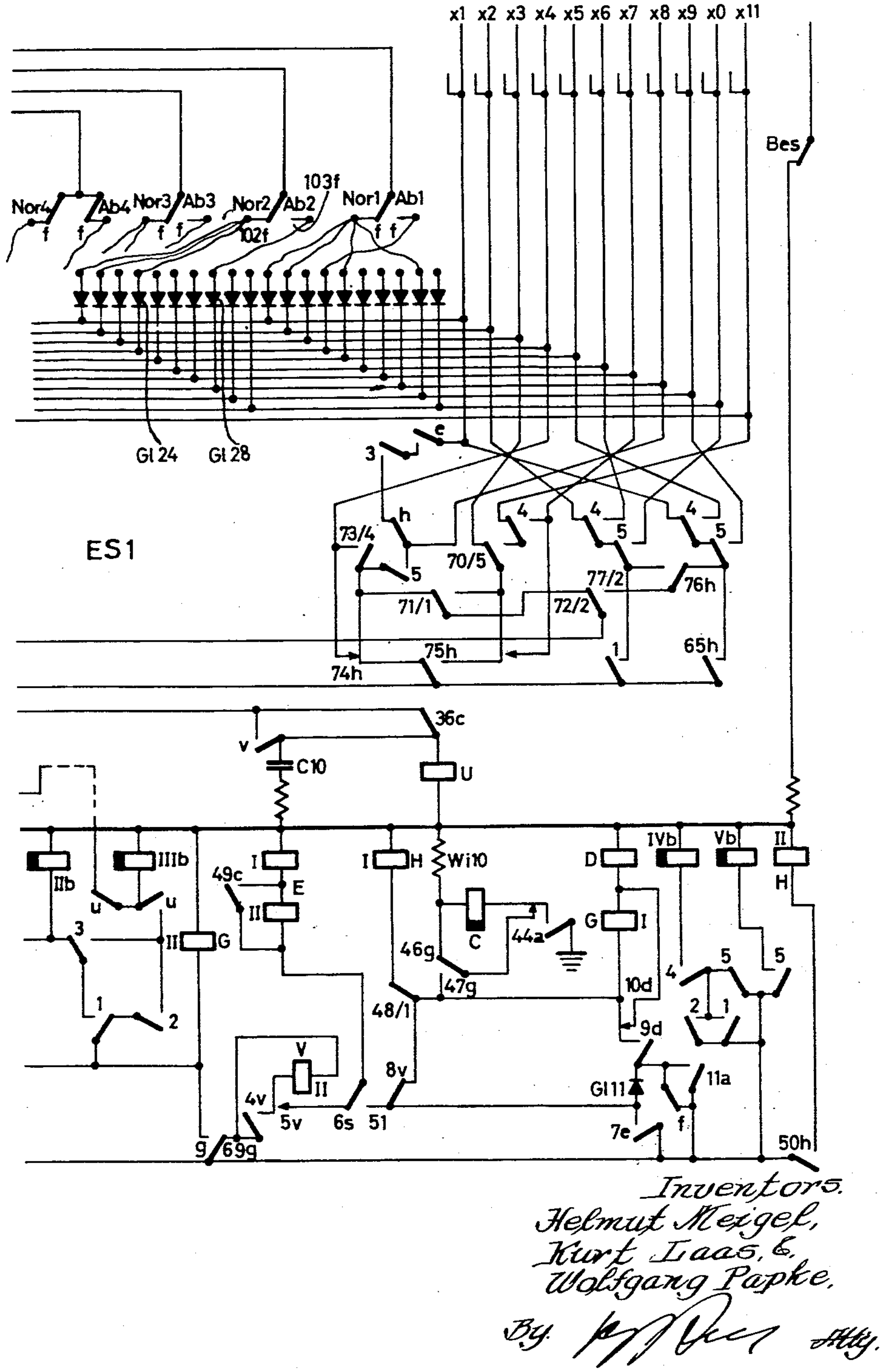

FIG. 1 is a block circuit diagram showing the connection devices required for the extension of calls;

FIGS. 2*a* and 2*b* illustrate circuit details of the transmission device U*e*A of FIG. 1;

FIG. 3 indicates the first group selector IGW of FIG. 1 which is associated with the transmission device;

FIGS. 4*a* and 4*b* represent details of the central or common marker ES1 of FIG. 1 with associated interconnecting switch AW of FIG. 1;

FIGS. 5*a* and 5*b* illustrate circuit details in connection with the separation of different digit suppression programs by the interconnecting switch; and FIG. 6 shows how the various figures should be placed when reading the following explanations.

Referring now to FIG. 1, a call between the subscriber stations T*n*A and T*n*B, assumed to be connected to the same exchange, extends by way of a call finder AS which is fixedly coupled with a first group selector IGW by way of a transmission device U*e*A containing the impulse repeater JW for the storage and release of subscriber number digits, said impulse being in the form of an electromechanical impulse repeater. The impulse repeater receives the selection impulse series and retransmits them without any recalculation thereof. The mechanical construction of this impulse repeater will be presently explained. In accordance with the invention, the transmission device U*e*A also contains the supervising relay which is operatively controlled by the marker potential of the marker. The transmission device or repeater U*e*A, responsive to being seized or responsive to receipt of the first impulse of an impulse series or, in some circumstances, responsive to full completion of the first impulse series, is connected with a central marker ES1 which is allocated to the first group selection stage, the connection of ES1 to the seized connection path being effected by means of an interconnecting switch AW. The marker ES1 receives the series of stored selection impulses from the impulse repeater JW of the transmission device U*e*A and converts them to the marker potential at a predetermined marker line. The first group selector thereupon sets its wipers in engagement with this marker line, effecting a test circuit which prepares for the stopping of the selector with its wipers in engagement with the next idle line of the marked bundle or group of lines. The remaining impulse responsive switches as, for example, the second group selector IIGW and the connector LW, are operatively set in similar manner by central markers ES2 and ES3, respectively. Ahead of the connector LW is fixedly disposed a battery feed transmission device U*e*B. The last selection impulse series effects setting of the connector wipers by means of the marker ES3, either by marking or by direct stepping control, upon the bank contacts of the subscriber station T*n*B, thus completing the extension of the call.

Calls to another exchange extend from the station T*n*A, assumed to be calling, by way of the call finder AS, battery feed transmission U*e*A, first group selector IGW, outgoing transmission device U*e*G, trunk line VL1, incoming transmission device U*e*K, second and third group selectors II/IIIGW and connector LW to the subscriber station T*n*C.

Incoming calls from another exchange are extended by way of trunk line VL2, incoming transmission device U*e*C, first group selector IGW, second group selector IIGW, battery feed transmisison U*e*B, connector LW to the called station such as station T*n*B.

It will be sufficient for the understanding of the invention to present detailed explanations relating to the transmisison device U*e*A (circuits being shown in FIGS. 2*a* and 2*b*) which is associated with the first group selector IGW (circuits being shown in FIG. 3) and relating to the central setting device ES1 with associated interconnecting switch AW (circuits being shown in FIGS. 4*a* and 4*b*).

The call finder AS (FIG. 1), omitted from the detailed circuits, operates in well known manner, by energization of a relay in the line circuit of a calling line, responsive to removal of the calling subscriber's hand set, over the line loop, such relay closing a circuit for the operation of the rotary magnet of the call finder, the call finder thereupon rotating its wipers to seek the bank contacts of the calling line and stopping rotation of the wipers upon finding the calling line. The line conductors are thereupon connected through to the line or battery feed relay A*t* in the transmission device U*e*A (FIGS. 2*a* and 2*b*) in a circuit (1) +, A*t*II, 1*e*, line conductor T, subscriber's line loop, line conductor R, 2*e*, A*t*I, —

Relay A*t* upon energizing closes its contact 4*at* and opens its contact 3*at* (lower left of FIG. 2*a*), thereby opening the short circuit around relay C*t* and thus causing operative energization of relay C*t* in a circuit.

(2) +, 4*at*, C*t*, resistor Wi1, —

Relay C*t* is held operated during temporary restoration of relay A*t*, incident to the receipt of the selection impulse series, due to damping effected over its own contact 5*ct*, in a circuit (3) +, 5*ct*, rectifier GL1, C*t*, resistor Wi1, —

So long as relay A*t* is energized, relay V*t* will be short-circuited by way of contact 4*at*. Relay C*t* places at contact 6*ct* ground potential on the incoming test or private conductor S, thereby busying the seized transmission device against further seizure in connection with another call.

The subscriber loop is periodically briefly interrupted responsive to the actuation of the dial at the calling station, thereby causing pulse-wise release and reenergization of relay A*t*. Upon first release of relay A*t*, relay V*t* will be energized in series with relay C*t*, relay V*t* being slow to release and therefore remaining operated during the receipt of an impulse series. Relay A*t* transmits at contact 8*at* upon each deenergization an impulse to the storing magnet EM (bottom left in FIG. 2*b*) of the electromechanical impulse repeater (JW in FIG. 1).

The impulse repeater comprises essentially three magnets, namely, the storing magnet EM, the marker magnet MM and the storage release or retransmit magnet AM (right center of FIG. 2*a*). The storage magnet EM is actuated by the incoming impulses and the storage release magnet AM is actuated by the impulses which are to be retransmitted. The marker magnet MM ascertains the number of impulses of a selection impulse series. Radially upon an insulating disk are disposed a plurality of contact strips or fingers which can be pressed under control of the marker magnet MM through a slot in the disk underneath a guide ring. The disk is stepwise rotated under control of the storage magnet EM in accordance with the incoming impulses. The contact fingers are held by the attracted marker magnet MM out of contact with a switch wiper *pk* (bottom right in FIG. 2*a*), such wiper moving incident to release of the impulses along the upper side of the insulating disk. The contact strip or finger corresponding to the first impulse of an impulse series is not pressed through the slot and thus remains upon the upper side of the disk. The storage release magnet AM (right center of FIG. 2*a*) causes the wiper *pk* to move stepwise in a direction opposite to that of the disk, and when the wiper *pk* encounters the contact strip or finger corresponding to the first impulse of the series, a circuit will be closed which determines the end of the impulse series, thereby interrupting the impulse transmission until the next selector is ready for receiving the corresponding impulses. The impulse repeater also has off-normal contacts *so*1 (upper center of FIG. 2*b*) which is actuated when the disk moves out of its normal position. The impulse repeater has moreover an end-position contact *pe* (bottom center of FIG. 2*b*) which opens in the terminal position of the impulse repeater, that is, when the impulse repeater is completely filled, relay B thereupon actuating over its winding II and preventing further acceptance of incoming impulse series.

The storing magnet EM is actuated impulsewise by the incoming impulses, responsive to deenergization of relay AI, and consequent restoration of contact 8*at*, in the circuit (4) +, 7*ct*, 9*b*, 8*at*, EM, —

The disk rotates out of its normal position by one step, thereby causing closure of contact *so*1. After the first impulse, relay V*t* is actuated, closing its contact 12*vt* and thereby causing actuation of relay K in the circuit (5) +, 7*ct*, 14*dt*, 10*b*, 11*ut*, 12*vt*, K, —

Relay K closes a holding circuit for itself over its contact 13*k*, namely (6) +, 7*ct*, 14*dt*, 19*b*, 13*k*, K, —

Upon conclusion of the first impulse, relay A*t* energizes again, opening its contact 8*at* and causing the storage magnet EM to restore, while closing its contact 16*at* and thus causing the marker magnet MM to energize in the circuit (7) +, 7*ct*, 16*at*, *em*, 15*vt*, MM, —

The marker magnet presses the contact fingers underneath the guide ring to the other side thereof. The marker magnet holds itself operated over its own contact *mm*1 and contact 15*vt* of relay V*t* in the circuit (8) +, 7*ct*, *mm*1, 15*vt*, MM, —

The disk is during the following impulse series rotated by one contact finger for each impulse. Accordingly, *n*—1 contact fingers are held on the other side of the insulating disk, *n* designating the number of impulses corresponding to the selected digit.

Upon energization of relay K, relay U*t* (center of FIG. 2*b*) is connected to the line conductor R by way of off-normal contact *so*1 and contact 21*k* of relay K, so as to transmit a demand criterion to the marker associated with the first group selector, such criterion causing start of operation of the interconnecting switch, that is, the switch AW in FIG. 1, which interconnects the marker ES1 with the first group selector. However, relay U*t* of the transmission device does not operate in this start circuit owing to the high resistance of the start relay in the setting device. Relay U*t* is connected to the line conductor R in the circuit (9) —, U*t*I, 17*j*, 18*y*, *so*1, 20*y*, 21*k*, 22*j*, 23*b*, 24*ct*, line conductor R When the marker ES1 (FIG. 4*a*) has found the first group selector and therewith the connecting line involved, the resistance of the start circuit in the marker will be reduced so that relay U*t* in the transmission U*e*A can be operatively energized. Relay U*t* closes its contact 25*ut* (upper right of FIG. 2*a*), thereby connecting winding I of the impulse relay J in the circuit

(10) +, 25*ut*, 26*vt*, 27*y*, 28*j*, G*l*2, resistor W*i*2, J—I, —

The capacitor C3 is charged in parallel to circuit "10" over the oppositely wound windings II and III of the relay J, the charging being effected in the circuit

(11) +, 25*ut*, 26*vt*, 27*y*, 28*j*, G*l*2, C3, J—II, J—III, resistor W*i*3, —

The operation actuation of relay J is thereby delayed until the capacitor C3 has been charged. As soon as relay J is actuated, contact 28*j* of the initial circuit for winding J—I is opened and ground potential is placed on the winding III of relay J by way of make contact 29*j*, resistor W*i*4 and rectifier G*l*3. The capacitor C3 holds relay J actuated until it is discharged and partially oppositely charged, whereupon relay J is again connected over its winding I by way of contact 25*ut* (see circuit 10). Whenever relay J energizes, the storage release magnet AM will be energized in parallel to the winding J—I and will rotate the wiper *pk* in a direction opposite to the direction of rotation of the disk carrying the contact fingers.

The above described operations are repeated until the wiper *pk* engages a contact finger that has not been pressed through to the other side of the guide ring.

A further contact 22*j* (upper left in FIG. 2*b*) controlled by relay J transmits the impulses to the marker as current interruptions over the line conductor R. Since relay Y (lower center of FIG. 2*a*) is deenergized, the winding II of relay U*t* (center of FIG. 2*b*) will remain short circuited over contact 18*y* so as to reduce the impedance of the impulsing circuit. The adjustable resistors W*i*4 and W*i*2 (FIG. 2*a*) supervise the length or duration of the opening and closing periods of the impulses that are being transmitted.

When the wiper *pk* encounters a contact finger of the impulse repeater, that has not been pressed through, thus marking the end of an impulse series, relay Y will be energized during the last energization of relay J, in the circuit

(12) +, 7*ct*, 29*j*, *pk*, *am*2, G*l*4, Y, —

Relay Y, upon actuation, by opening contact 20*y*, interrupts the original energizing circuit for relay U*t* (see circuit 9). Relay U*t* is held operated over its winding III (right lower center of FIG. 2*a*) until relay J is finally restored and contact 29*j* accordingly opened. Relay Y at contact 27*y* interrupts the original energizing circuit "10" for relay J. The marker, upon being released at the end of an impulse series transmitted thereto, disconnects ground potential from the line conductor R. Relay U*t* accordingly restores. The release of relay Y is delayed by the discharge current of capacitor C8 in a circuit including contacts 30*y* and 31*dt*. Upon restoration of relay Y, relay U*t* (windings I and II) is again connected to the line conductor R since relays C*t* and K are still energized. The demand criterion for the next marker associated with the next group selector is thus transmitted. The high resistance start relay in the marker of the next selector will again be connected to the line conductor R, such start relay causing the associated interconnecting switch to connect the respective marker with the connection path involved in the operations. When the marker is ready to receive impulses, the high resistance therein is replaced by a low resistance with respect to ground potential, thus again causing relay U*t* in the transmission device U*e*A to energize. The further switching operations correspond to those already described. Upon completion of transmission of the digit last stored in the impulse repeater, the latter will be again in its normal position, wherein contact *so*1 is opened and relay U*t* disconnected from line conductor R.

In case all outgoing lines or trunks in a marked decade of a group selector are busy, the marker associated with such group selector will place battery potential on the conductor T, thereby causing energization of relay B (winding I; top of FIG. 2*b*) in the circuit

(13) —, conductor T, 32*dt*, 33*et*, 34*y*, B—I, +

Relay B holds itself over its winding II (bottom of FIG. 2*b*) after opening the shunt extending over its contact 9*b*, in the circuit

(14) +, 7 *ct*, B—II, resistor W*i*5 in series with resistor W*i*6, —

Relay B, upon actuating opens its contact 36*b* (top of FIG. 2*b*), thereby opening the seizure circuit extending to the successive group selectors and thus causing such selectors to release. Alternating current B*es* (bottom of FIG. 2*a*) indicating busy condition is at the same time connected to the winding A*t*—III, such current being inductively transmitted to the other two windings I—A*t*—II and therewith as a busy signal to the calling party.

When a group selector connects with a transmission device of a trunk line, negative potential will be connected, in such transmission device, to the line conductor R, such potential causing energization of relay D*t* (relay Y being energized and relay U*t* becoming deenergized) in the circuit

(15) —, conductor R (FIG. 2*b*), 24*ct*, 23*b*, 22*j*, 21*k*, 37*y*, 103*ut*, D*t*, 7*ct* (FIG. 2*a*), +

Relay D*t* remains actuated over its own contact 39*dt* in a holding circuit

(16) +, 7*ct*, D*t*, 39*dt*, resistor W*i*9, —

Relay D*t* closes at contact 40*dt* (top left of FIG. 2*b*)

an impulse loop over the two line conductors R and T, such loop containing the relay E*t* and the choke D*r*. At contact 31*dt* (FIG. 2*a*) relay D*t* opens a short circuit for the windings Y*a*, Y*b*, Y*c*, thereby causing a further delay in the restoration of relay Y for the purpose of securing a sufficient pause between two impulse series in the transmission of impulses over a trunk line.

Relay D*t* is also energized responsive to connection of battery potential to line conductor R at a connector when the connector reaches the bank contacts of a desired called line. The relay D*t* completes in such case again a loop extending over both line conductors.

When the called party answers, the potential on the line conductors is reversed in the connector, causing relay E*t* to energize over its winding I (top left of FIG. 2*b*). Relay E*t* closes its contact 40*et*, thereby closing a holding circuit for itself which extends over its winding III and the outgoing conductor S and thence over the selectors to the connector or a transmission device to ground. Relay E*t* opens its contacts *et*1 and *et*2 (top of FIG. 2*a*), thereby causing relay A*t* to restore and thus bringing about restoration of relays C*t* and V*t*. At contacts 41*et* and 42*et*, relay E*t* connects the line conductors through. The battery feed for the calling and called parties is effected from the connector.

In case the transmission device U*e*A extends to a first group selector in which given digits are to be absorbed, voltage taken in a predetermined phase of the connection, in the marker of the group selector, from the marker lines, is placed on the conductor *g*, causing relay S*t* (right off center in FIG. 2*b*) to energize in the circuit

(17) —(in the marker), conductor *g*, 44*st*, S*t*, 43*k*, +

Relay S*t* is held energized over its contact 45*st* in a local holding circuit

(18) +, 43*k*, S*t*, 45*st*, resistor W*i*7, —

Relay S*t* disconnects itself from the conductor *g* by opening its contact 44*st* and places battery potential on the conductor *g* by way of its contact 46*st* and resistors W*i*8 and W*i*7. When the impulse repeater in the transmission device U*e*A leaves its normal position after receipt of the first current impulse of the first selection impulse series, causing voltage to be connected to the conductor R by way of off-normal contact *so*1 and relay U*t*, relay R (left upper part of FIG. 4*a*) will be energized in the circuit

(19) —, U*t*I, U*t*II, *so*1, 20*y*, 21*k*, 22*j*, 23*b*, 24*ct*, line conductor R, 1*cg* (top left of FIG. 3—first group selector), G*l*8, conductor marked "Start" to FIG. 4*a*, R—II, 33*c*, R—I, 34*p*2, + (see also circuit "9")

In this circuit, the high resistance relay R which starts the operation of the interconnecting switch AW (for interconnecting the marker with the first group selector), will energize but the relay U*t* in the transmission device U*e*A will remain at normal. It may be mentioned at this point that relay U (near bottom center of FIG. 4*b*) is in normal condition of the marker energized in the circuit

(20) +, 37/3 (near bottom right of FIG. 4*a*) over to FIG. 4*b*, 35*s*, 36*c*, U, —

Relay U restores only during longer interruptions of this circuit since it has a considerable release delay due to the parallel capacitor C10 having high capacitance. Contact 32*u* in the start circuit of relay R is accordingly closed. Relay R upon actuating connects relay S (near bottom center of FIG. 4*a*) in the circuit

(21) +, 38*r*, S, —

Relay S, at contact 21*s* (bottom left of FIG. 4*a*) connects the field coils N1, N2 (near bottom left of FIG. 4*a*) of the interconnecting switch AW which is, as are all other switches of the entire system, a motor-driven rotary switch.

The motor-driven rotary switches are in known manner provided with two field coils which are mutually spatially displaced by 90° and having an unwound Z-shaped armature rotatably journalled at the intersection of the axes of the coils. The field coils are alternately successively operatively switched in by means of cam contacts controlled from the switch shaft, thereby exerting a torque for rotating the armature. The armature is thus continuously rotated and drives through the medium of gear means the switch shaft and wipers carried thereby. Simultaneous energization of both field coils stops the rotation of the shaft and therewith of the switch wipers. The stopping of the operation of the switch is effected by a quickly operating test relay having a customary auxiliary test relay cooperatively associated therewith.

Relay S, upon closing its contact 21*s*, causes in the illustrated condition of the circuit operation of the field coil N2 (bottom left of FIG. 4*a*) in the circuit

(22) +, 21*s*, 39*e*, cam controlled contact *n*2, field coil N2, —

Rotation of the switch shaft and wipers carried thereby, responsive to energization of the field coil N2 causes opening of contact *n*2 and closure of contact *n*1 to effect operative actuation of field coil N1. The field coils N1 and N2 are in this manner alternately operatively connected to effect rotation of the switch shaft and the wipers carried thereby. Relay U (near bottom center of FIG. 4*b*) connects at its contact 40*u* (top left of FIG. 4*a*) the windings of the test relay P1 to the wiper *n*II of the interconnecting switch AW. As soon as the interconnecting switch finds the connection line extending from the transmission device U*e*A to the first group selector, relay P1 will energize by way of the associated switch outlet which is disposed in parallel to the "Start" conductor on the line conductor R, in the circuit

(23) +, I—P1 (left off center in FIG. 4*a*), 42*g*, II—P1, 41*e*, 40*u*, wiper *n*II, 1*cg* (FIG. 3), line conductor R, over to FIG. 2*b*, 24*ct*, . . . see circuit "9," U*t*I, —

Relay P1 has low resistance and relay U*t* in the transmission device U*e*A (Fig. 2*b*) therefore will be operatively energized. As already described, this causes release of the stored impulses. Relay P1 in the marker stops the further operation of the switch by closing its contact 43*p*1, thereby bridging the field coils N1 and N2 to effect simultaneous actuation thereof. Relay P1 by closing its contact 26*p*1 also switches in the relay A over its winding I, in the circuit

(24) +, 26*p*1, 28*d*, A—I, —

Relay A upon operating switches in relay C (near bottom center of FIG. 4*b*) over contact 44*a* in the circuit

(25) +, 44*a*, C, resistor W*i*10, —

Relay C interrupts at its contact 33*c* (top left of FIG. 4*a*) the start circuit for relay R (see circuit "19"). Relay R disconnects relay S, the latter opening its contact 21*s* and thereby disconnecting the field coils N1 and N2.

As already described, the line conductor R is impulsewise interrupted incident to the release of the impulse series from the transmission device U*e*A. Relay P1 serves in this phase of the operations as an impulse receiving relay, restoring with each impulse and actuating again in the following pause. Relay A accordingly follows the impulses. Upon first release of relay A, relay V (bottom of FIG. 4*a*) is energized by way of contact 2*a* in the circuit

(26) +, 1*c*, 2*a*, 68*g*, 67*ph*, V—I, —

Relay V, the winding II of which (bottom right of FIG. 4*b*) is short circuited over its own contacts 4*v*, 5*v*, is held energized for the duration of transmission of an impulse series despite the fact that the circuit over its winding I is impulsewise interrupted at contact 2*a*. Relay V, responsive to restoration of relay S, switches in the relay E (bottom right of FIG. 4b) in the circuit

(27) +, 1c (bottom right of FIG. 4a), over to FIG. 4b, contact 69g, 4v, 5v, 6s, 49c, I—E, —

Relay E prepares at its contact 7e a circuit for relay D, such circuit becoming closed at the end of an impulse series after the restoration of relay V. Relay C is likewise held energized during an impulse series despite the fact that its energizing circuit is interrupted at contact 44a incident to each restoration of relay A. Relay A transmits the incoming impulses to the counting chain comprising the relays I, II, III, IV, V and auxiliary relay H. The relays of the counting chain are energized in accordance with the number of impulses of an impulse series as shown in the following table:

| Digit | Counting Chain Relays Energized at Conclusion of Digit | Marker Lines marked by— | |
|---|---|---|---|
| | | Capacitor Cg | Relay S |
| 1 | I, II | x1 | x2 |
| 2 | II, III, H | x2 | x3 |
| 3 | I, III | x3 | x4 |
| 4 | IV, H | x4 | x5 |
| 5 | I, II, IV | x5 | x6 |
| 6 | II, III, IV, H | x6 | x7 |
| 7 | I, III, IV, V | x7 | x8 |
| 8 | V, H | x8 | x9 |
| 9 | I, II, V | x9 | x0 |
| 0 | II, III, V, H | x0 | x11 |
| 11 | I, III, V | x11 | x1 |

For example, responsive to the digit 2, marker lines 2 and 3 will be marked; responsive to the digit 6, marker lines 6 and 7, etc., will be marked. The first marker line serves for the marking of the impulse series proper, while the second marker line serves for the stopping of the selector operation at the end of the selected group of lines, in case all lines of such group should be busy. This overrun position constitutes at the same time the start position for the next group of lines. The marker lines extend in usual manner to the contacts of the marker contact bank of the first group selector shown in FIG. 3 (IGW in FIG. 1), such contact bank being associated with the wiper mc. Conductors are branched off from the marker lines in the marker device, such branches extending to different common points according to numerical values, or lacking circuit connections entirely. For example, the marker lines 1, 6, 8, 9, 0, allocated to the numbers or digits 1, 6, 8, 9, 0, which are to be repeatedly suppressed, are provided with branches left entirely free. The branch of the marker line 2, corresponding to the digit 2 which is to be suppressed once, is carried by way of rectifier means to a switching point Ab which is connected by way of contacts of relays E and G with the wiper nIII. Branches extending from marker lines 3, 4, 5 and 7 lead by way of rectifiers to a common point Nor which is likewise connected to the wiper nIII by way of contacts controlled by relays R, E and G. To the marker lines, 3, 4, 5 and 7 are allocated digits which are not to be suppressed. The bank contacts accessible to the wiper nIII extend by way of conductor g to relay St (FIG. 2b) of the transmission device UeA. The relays R and E in the marker device are in a predetermined phase of the operations connected in parallel with the branches of the marker lines, the relays R and E serving now as start relays for the first group selector.

The case shall first be considered that the impulse repeater in the transmission device UeA has released a digit, for example, digit 3, which is not to be suppressed. As soon as the corresponding impulse series is concluded, relay A in the marker device (FIG. 4a) will be continuously energized since relay P1 is likewise continuously energized. Relay V therefore releases at the conclusion of the impulse series. Upon release of relay V, relay D (bottom right of FIG. 4b) is energized in the circuit

(28) +, 1c (bottom of FIG. 4a), over to FIG. 4b, 7e, 8v, 10d, D, —

Relay D closes its contact 9d while opening its contact 10d, thereby opening the shunt around relay G and the latter energizes in series with relay D, in the circuit

(29) +, 1c, 7e, rectifier Gl11, 9d, G, D, —

Relay G opens its contact 69g and closes its contact g (bottom of FIG. 4b) thereby closing a holding circuit for itself which extends over its winding II (G—II, bottom right of FIG. 4a). Relay D remains actuated until the relay A restores. After release of relay E, relay D will be held energized by way of contact 11a of relay A, in the circuit

(30) +, 1c (bottom right of FIG. 4a), over to FIG. 4b, 11a, 9d, I—G, D, —

Relay E, being short circuited over contact 49c releases with strong delay. Upon restoration of relay V and during the restoration interval of relay E, relay A is connected to the wiper nII, holding itself actuated over such wiper to the transmission device UeA in the circuit

(31) +, 31ph (top left of FIG. 4a), 56e, A—II, 53a, 55v, 40u, nII, 1cg (top left in FIG. 3), conductor R to FIG. 2b . . . see circuit "9," I—Ut, —

Relay A is held actuated in this circuit until relay E is finally restored. However, relay E is still held energized in the circuit

(32) +, 34p2 (top left of FIG. 4a), R—I, 58c, 57a, E—III, 31r, over to FIG. 4b, Nor, rectifier Gl13, marker line x3, 70/5, 71/1, 72/2, over to FIG. 4a, 14g, 13r, 12d, resistor Wi14, —

Relay R is in this circuit merely pre-energized. Relay St (center right of FIG. 2b) is now energized from battery potential on resistor Wi14 (lower right in FIG. 4a) in the circuit

(33) —, resistor Wi14, 12d, 13r, 14g, over to FIG. 4b, 72/2, 71/1, 70/5, marker line x3, Nor, over to FIG. 4a, 31r, 17e, 16g, wiper nIII, over to FIG. 3, conductor g, over to FIG. 2b, 44st, St, 43k, +

Relay St energizes in this circuit, as already described, disconnects itself from the supervising line g at contact 44st, thereby completing a local holding circuit for itself by way of contact 45st and placing by way of contact 46st battery potential on the conductor g. Relay R now finally energizes in the circuit

(34) +, 34p2 (top left of FIG. 4a), R—I, 58c, 57a, E—III, 17e, 16g, wiper nIII, over to FIG. 3, conductor g, over to FIG. 2b, 46st, resistors Wi8, Wi7, —

Relay E continues to be held energized in this circuit. Relay R actuates its contact 38r to close an energizing circuit for relay S (lower center of FIG. 4a). Responsive to energization of relays S and E, a start circuit is completed for the field coils M1, M2 of the first group selector (FIG. 3), namely, circuit

(35) +, 21s (bottom left of FIG. 4a), 22c, wiper nVII, over to FIG. 3, m1, M1, —

The field coils M1, M2 are alternately switched in by way of the cam controlled contacts m1, m2, causing rotation of the switch shaft and wipers ma, mb, mc and md carried thereby, the selector thus seeking the marker line x3. As soon as this line is found, relay P1 (FIG. 4a, center left) is actuated in the capacitor discharge circuit

(36) C9 (center of FIG. 4a), 18s, resistor Wi15, II—P1, 19e, 20s, wiper nIV, over to FIG. 3, wiper mc, marker line x3, over to FIG. 4b, 70/5, 71/1, 72/2, over to FIG. 4a, 14g, C9

Test relay P1 energizes in this circuit.

It may be mentioned at this point that the capacitor

C9 was charged prior to energization of relay S, in the circuit

(37) +, 52s, C9, 13r, 12d, resistor Wi14, —

Relay P1 is held operated locally by way of its winding I in the circuit

(38) +, I—P1 (center left of FIG. 4a), 23g, 24p1, 25d, —

Relay P1 at contact 26p1 connects the test relay P2 (FIG. 4a top center) preparatorily to the wiper nIV for the purpose of testing the individual lines in the marked group or bundle. The switch rotates its wipers past the marked position until an idle line is found which is marked by battery potential. Test relay P2 thereupon energizes in the circuit

(39) +, 26p1, 27d, rectifier Gl14, resistor Wi17, P2—I, P—II, 20s, wiper nIV, over to FIG. 3, wiper mc, conductor EL, —

Relay P2 closes its contact 63p2, thereby connecting the auxiliary test relay PH in parallel to the test circuit and causing energization thereof. Contact 34p2 is opened and relays R and E are accordingly deenergized. Relay PH connects the test relay at contact 64ph to the test circuit independent of contact 20s controlled by relay S. Relay V (bottom of FIG. 4a) is energized over its winding I by way of contact 66ph in the circuit

(40) +, 66ph, V—I, —

Upon energizing, relay V closes its contact 29v, thereby placing ground potential on the wiper nV (top of FIG. 4a) and thereby causing energization of relay Cg in the first group selector (FIG. 3), in the circuit

(41) +, 29v, 30d, nV, over to FIG. 3, Cg—II, wiper control magnets AD, —

The wiper control magnets AD—AD which energize in this circuit press the two line wipers ma and mb in engagement with the corresponding selected bank contacts, thereby switching the line conductors through to the next successive selector. Relay Cg in the first group selector is after release of the marker device held energized over the incoming private or test conductor S, in the circuit

(42) +, 6ct (top left in FIG. 2a), conductor S, over to FIG. 2b, contact 36b, conductor S over to FIG. 3, 3cg, Cg—I, Cg—II, wiper control magnets AD—AD, —

Responsive to actuation of relay PH in the marker device, contact 31ph is opened, interrupting the circuit "31" for relay A. Relay A restores, causing release of relays C, D, G, P1, P2, PH as well as release of those of the relays of the counting chain which had been energized. The marker device is thus released.

Battery potential is again connected to the conductor R in the transmission device UeA, such potential constituting the demand criterion for a marker device of the next successive selection stage in the same manner as the marker device for the first group selector was demanded due to battery potential on the line conductor R as previously described. The interconnecting switch AW for such control device starts operating and its wipers seek the bank contacts belonging to the trunk seized by the first group selector. The corresponding impulse series is thereupon released from the transmission device UeA as described before, effecting the switching operations in the manner already explained.

In case the selector finds all lines in the marked group busy, its wipers rotate to the overrun position which at the same time constitutes the start position of the group or bundle 4. As soon as the wipers of the first group selector are set on the marker line 4, a circuit is closed for test relay P2, namely, circuit

(43) +, 26p1, 27d, rectifier Gl14, resistor Wi17, P2—I, P2—II, 20s, wiper nIV, over to FIG. 3, nIV, wiper mc, marker line x4, over to FIG. 4b, x4, 74h, 75h, over to FIG. 4a, 64s, 12d, resistor Wi14, —

Relay P2, at contact 62p2 (top right off center of FIG. 4a) bridges the two field coils M1 and M2 (center bottom of FIG. 3), of the first group selector, thereby stopping the operation thereof with the wipers on the bank contacts belonging to such overrun position. The auxiliary test relay PH again energizes in the test circuit, thereby switching in the relay V according to circuit "40." All relays of the marker device are thereupon restored, thus releasing the marker device. However, as already explained, relay Cg in the first group selector is prior to the release of the marker device energized by way of wiper nV, relay Cg remaining actuated by way of the incoming seizure or private conductor S. A circuit is thereupon closed by way of wiper md (right off center in FIG. 3) for an overrun counter DD, namely, circuit

(44) +, 32d (top center of FIG. 4a), 31v, wiper nI, over to FIG. 3, nI, 4cg, md, counter DD, —

A potential Bes (top right of FIG. 4b) signifying busy condition is at the same time transmitted from the marker device to the wiper mb of the first group selector (FIG. 3) and therewith to the line conductor T, such potential causing energization of relay B in the transmission device UeA, in the circuit "13," relay B (FIG. 2a) closing its contact 35b to transmit busy tone to the calling party and causing release of the connection so far built up.

It shall be assumed that in the case to be considered next, the impulse repeater of the transmission device UeA has released a digit, for example, digit "2," which is to be supressed but once in the first group selector. The marker device is connected as already explained. The receipt of digit "2" effects marking of the marker line 2 for the test circuit over capacitor C9 and of the marker line 3 for overrun testing by way of resistor Wi14 in case all lines in the group 2 are busy.

Upon energization of relay G at the conclusion of the corresponding impulse series, after release of relay V and while relay E is still actuated, both start relays R and E (top left in FIG. 4a) are connected to the wiper nIII (top right in FIG. 4a) and therewith to the supervising line g extending to the transmission device UeA, in the circuit

(45) +, 34p2, R—I, 58c, 57a, E—III, 17e, 16g, wiper nIII, over to FIG. 3, nIII, conductor g, over to FIG. 2b, 44st, St, 43k, +

The corresponding relays cannot be energized in this circuit and this means, that the digit "2" does not effect operative actuation of the first group selector. Relay E restores. Upon restoration of relay E, the branch from the marker line 2 will be connected to the conductor g by way of the switching point Ab (top left of FIG. 4b), thus causing energization of relay St (FIG. 2b) in the transmission device UeA, in the circuit.

(46) —, resistor Wi14 (near bottom right in FIG. 4a), 12d, 13r, 14g, over to FIG. 4b, 77/2, 76h, 78/5, 79/4, marker line 2, rectifier Gl15, switching point Ab, over to FIG. 4a, 15c, 16g, wiper nIII, over to FIG. 3, nIII, conductor g, over to FIG. 2b, 44st, 43k, +

Relay St in the transmission device operates, closes a local holding circuit for itself at contact 45st, thereby disconnecting itself from conductor g, and placing battery potential on conductor g by way of its contact 46st and resistors Wi8 and Wi17. However, this potential cannot affect relay R due to restoration of relay E.

Relay A which had been held energized over wiper nII and line conductor R to the transmission device UeA, restores responsive to release of relay E. Responsive to restoration of relay A, all remaining relays of the marker release and the marker device is again free for receiving the impulse series corresponding to the next digit.

After release of relay C in the marker device, the demand or triggering criterion transmitted from the transmission device U*e*A can again operatively effect the relay R. The interconnecting switch sets its wipers *n*I to *n*VIII again to connect with the line involved in the connection. The next digit, for example, digit "6" is thereupon released and is received in the marker device of the first group selector. Upon completion of receipt of the corresponding impulse series, the marker lines 6 and 7 will be marked. Upon operative energization of relay G, at the end of the impulse series, relay R will be energized, as already explained, over wiper *n*III and conductor *g* to battery potential in the transmission device U*e*A. Relay E is held energized in series with relay R. The consequence is that the start circuit for the field coils M1 and M2 of the first group selector (FIG. 3), is closed, causing this selector to set its wipers on the bank contacts of the marked line 6. The corresponding and also the further operations are analogous to those already described in connection with the retransmission of digit "3."

After the suppression of the digit "2" in the marker device, any subsequently transmitted digit including digit "2" will be effective for the setting of the first group selector.

It shall now be assumed that the transmission device U*e*A initially releases to the marker device a digit that has to be suppressed repeatedly; among these digits are in the illustrated example the digits 1, 6, 8, 9, 0, the branches of which, extending from the corresponding marker lines, are left unconnected. Accordingly, if it is assumed that the transmission device U*e*A retransmits as the first digit the digit "1," relay S*t* (FIG. 2*b*) of the transmission device and consequently relay R (FIG. 4*a*) in the control device ES1 will not be energized and relay E will not be held actuated. The first group selector therefore will not be operated. The same happens if the next retransmitted digits are digits 6, 8, 9, 0. In case digit "2" is subsequently retransmitted, such digit will be suppressed but once; any digits thereafter transmitted will be utilized for the setting of the first group selector.

The release of a connection is effected responsive to replacement of the hand sets at the calling and at the called subscriber stations. Holding ground for relay E*t* (near left top of FIG. 2*b*) in the transmission device and for the relay C*g* in the first group selector IGW is thereby disconnected in the connector and these relays restore, thus effecting release of all switches involved in the connection.

It is of course understood that the suppression of digits may not only be effective in the first selection stage but similarly also in the second or subsequent selection stage. A relay corresponding to relay S*t* in the transmission device U*e*A is in such cases allocated to the corresponding selector switch or switches.

FIGS. 5*a* and 5*b* show a marker device for the first group selector, which differs from the marker device illustrated in FIGS. 4*a* and 4*b* merely by the feature that the connections branching off from the marker lines to the switching points "N*or*" and "A*b*" as well as the unconnected branch connections, are not fixedly disposed once for all, but can be varied depending upon the setting of the interconnecting switch AW with respect to predetermined first group selectors. This makes it possible to fit the combination of digits not to be suppressed and those to be suppressed respectively once or several times, to the needs of different connection routes. The circuit is adapted to mark four combinations or programs. This may, for example, be advantageously effected by means of wiper *n*I (top right hand part of FIG. 5*a*) of the interconnecting switch AW, which is employed in FIG. 4*a* for connecting ground potential for the actuation of the overrun or overflow counters. The transmission of this ground potential for the overflow counters is in FIGS. 5*a*, 5*b* effected by way of the wiper *n*III. A slight modification had for this purpose to be made in the circuit of the first group selector shown in FIG. 3 as indicated therein in dash lines. The modification provides in the conductor *n*III a switch-over contact 5*cg*—6*cg* and a connection going to the conductor *n*I. Since the switching functions in the setting or control device of FIGS. 5*a*, 5*b* correspond practically to those discussed in connection with FIGS. 4*a*, 4*b*, switching elements in FIGS. 5*a*, 5*b*, having identical functions as corresponding elements in FIGS. 4*a*, 4*b*, are similarly referenced. The various circuits can be easily traced and repeated detailed explanations are accordingly deemed unnecessary.

Since the marker device and therewith the interconnecting switch are as a rule cooperatively associated with a selector board containing a plurality of first group selectors, and since sets of bank contacts of the interconnecting switch are respectively connected with the corresponding selectors in such board, the selectors provided for routing connections in corresponding directions are connected to bank contacts accessible to the wiper *n*I (FIG. 5*a*) in accordance with a routing program. It is assumed in FIGS. 5*a*–5*b* that the selectors connected to the bank contacts 1 to 8 correspond to program 2, selectors connected to the bank contacts 9 to 13 correspond to program 1, selectors connected to the bank contacts 14 to 17 correspond to program 3, and selectors connected to the bank contacts 17 to 24 correspond to program 4. In accordance with the program, the branches from the marker lines 1, 2, 5 and 9 provide for digits which are not to be suppressed, digit 4 is to be suppressed only once, and digits 3, 6, 7, 8, 0 are to be suppressed repeatedly. Accordingly, branches from the marker lines 1, 2, 5, 9 extend to the switching point N*or*1, a branch from marker line 4 extends to switching point A*b*1, and the remaining branches are unconnected.

Program 2 contains digits 1, 2, 4—corresponding branches extending from the marker lines 1, 2, 4 to the switching point N*or*2—digit 8 is to be suppressed once, the corresponding branch from the marker line 8 extending to the switching point A*b*2. The branches from the marker lines 3, 5, 6, 7, 9, 0 remain unconnected.

The further programs 3 and 4 are for the sake of clarity merely indicated.

If it is now assumed, for example, that the marker device has established connection with a first group selector in the selector group 1 to 8, there will be, at the conclusion of the selection impulse series, for example, digit 4, released from the impulse repeater and received by the marker device, upon release of relay V and during the release interval of relay E—relay A being still energized—relay R in series with the winding E—III against ground on the wiper *n*III and the conductor *g*. The latter extends again to the relay S*t* (FIG. 2*b*) which is connected to ground potential. Parallel to this circuit is connected the marker potential which is derived in the circuit

(47) —, resistor Wi14 (lower right in FIG. 5*a*), **12*d*, 13*r*, 14*g***, over to FIG. 5*b*, 72/2, 71/1, 73/4, marker line *x*4, G*l*24, N*or*2, **10*f***, over to FIG. 5*a*, wiper *n*I of the interconnecting switch (position 1–8), **31*r*, 101*v*, 16*g***, wiper *n*III, over to FIG. 3, conductor *g*, over to FIG. 2*b*, **44*st***, relay S*t*, **43*k***, +

Relay S*t* energizes again in the circuit, reversing the polarity on conductor *g*. Responsive to such polarity reversal, relay R in the marker device (upper center of FIG. 5*a*) can energize and relay E is held energized in series therewith. The energization of these start relays causes operative actuation of the first group selector (FIG. 3) and consequent setting of the wipers thereof in engagement with the marker line 4.

In case the digit "8," which is to be suppressed once, is released by the impulse repeater JW and received by the marker device, relays R and E—III will be at the end of the corresponding impulse series again on the *g*-conductor to the relay S*t*, by way of wiper *n*III, but since relay F has not yet energized, there will not be any marker potential in parallel with this supervising circuit and relay S*t* therefore cannot be operatively actuated. Relay R consequently cannot energize and relay E cannot be held energized and restores, followed by restoration of relay A whereupon relay F energizes in the circuit

(48) + (bottom right in FIG. 5*a*), 1*c*, 2*a*, 107*g*, F, —

Relay F actuates its contact 103*f*, thereby switching over from the switching point N*or*2 to the switching point A*b*2 and thus connecting marker potential to the wiper *n*III and conductor *g* to relay S*t* in the circuit

(49) —, resistor W*i*14 (lower right in FIG. 5*a*), 12*d*, 13*r*, 14*g*, over to FIG. 5*b*, . . . marker line 8, G*l*28, A*b*2, 103*f*, over to FIG. 5*a*, wiper *n*I (position 1–8), 31*r*, 101*v*, 16*g*, wiper *n*III, over to FIG. 3, conductor *g*, over to FIG. 2*a*, 44*st*, relay S*t*, 43*k*, +

Relay S*t* energizes in this circuit, closes a holding circuit for itself at contact 45*st*, thereby disconnecting itself from conductor *g* and placing at contact 46*st* battery potential on the conductor *g* to prepare for the energization of relay R in the course of the next successive impulse series. Relay F upon energizing opens its contact *f* (bottom right of FIG. 5*b*), thereby causing disconnection and release of relays D and C, the latter relay causing deenergization of all other relays including relay F.

A demand signal is again transmitted from the transmission device U*e*A to the marker device. At the conclusion of the next impulse series, relays R and E—III will again be connected to the wiper *n*III and conductor *g*. Due to reversal of potential on the conductor *g*, relay R can now immediately energize and relay E can be held energized, causing closure of the start circuit for the field coils of the first group selector, such selector accordingly rotating its wipers to set them in engagement with the corresponding marker line. These and the remaining switching operations correspond to those already described except for the actuation of the overflow counters in case all lines of a marked line group (decade) are found busy when the first group selector rotates its wipers to the overrun or overflow position which coincides with the start position of the next group. The overflow counter is operated as follows:

Upon energization of the test relay P2, in the overflow position of the wipers of the first group selector, by way of wiper *n*IV of the interconnecting switch and the wiper *mc* of the first group selector and the marker multiple, as already described, relay P*h* will be energized in the corresponding test circuit in parallel therewith. Relay P*h*, likewise as described before, connects relay V by way of its contact 66*ph* (bottom center of FIG. 5*a*). Relay C*g* in the first group selector (FIG. 3) is now energized by way of wiper *n*V. The overflow counter DD is thereupon actuated by way of wiper *n*III in the circuit

(50) + (right upper center of FIG. 5*a*), 100*v*, 16*g*, wiper *n*III, over to FIG. 3, 6*cg*, 4*cg*, wiper *md*, DD, —

In case the marker device taken into operation connects with a first group selector in the selector group 9 to 13, the predetermined program 1 becomes operative by way of wiper *n*I. Analogous switching operations which can be easily ascertained based upon the foregoing description take place depending upon the impulse series corresponding to digits received.

The number of programs can of course be increased by the provision of auxiliary relay means cooperating with the relay F.

Changes may be made within the scope and spirit of the appended claims which define what is believed to be new and desired to have protected by Letters Patent.

We claim:

1. In an automatic telephone system having selection stages for extending calls, the respective selection stages including selectors respectively equipped with individual motor drive means, selection impulse transmitting devices preceding said selectors and respectively cooperatively associated with predetermined selectors respectively corresponding thereto, and having marker devices which are respectively common to a group of selectors included in a predetermined selection stage; a circuit arrangement for causing a given marker device to control the operative setting of selectors in the extension of calls, responsive to incoming selection impulse series, including suppression of predetermined impulse series, said circuit arrangement comprising means for causing a given marker device to establish connection with a selector and the preceding selection impulse transmitting device cooperatively associated therewith and involved in the extension of a call, means for transmitting from said selection impulse transmitting device selection impulse series of said marker device, marker lines extending from said marker device to bank contacts of the selector connected therewith, means in said marker device for placing predetermined marker potential on said marker lines, selector start relay means in said marker device, a supervising circuit including a single control conductor extending from said marker device to said preceding selection impulse transmitting device, a control relay disposed in said preceding selection impulse transmitting device, means for connecting said control relay with said control conductor, circuit means operatively effective at the conclusion of each selection impulse series received by said marker device for connecting said start relay means to said supervising circuit, branch lines extending from said marker lines, circuit means extending from said branch lines in parallel to said supervising circuit for connecting marker potential to said switching means, said control relay responding operatively to predetermined potential connected thereto, and circuit means controlled by the operation of said control relay for connecting predetermined potential to said supervising circuit to cause operative actuation of said selector start relay means for effecting the operation of said selector to extend the call to the line group marked by said setting device over a marker line.

2. A system and circuit arrangement according to claim 1, comprising a start relay for said marker device, and means controlled by said control relay for connecting to said control conductor a potential for governing the actuation of said start relay.

3. A system and circuit arrangement according to claim 1, comprising means governed by said control relay responsive to actuation thereof for disconnecting itself from said control conductor while connecting itself in a local holding circuit, and further means governed by said control relay for connecting said control conductor to a potential opposed to the potential initially connected thereto which effected operative actuation of said control relay.

4. A system and circuit arrangement according to claim 1, wherein said marker lines include marker lines for selection impulse series which are to be suppressed repeatedly, such marker lines being excluded from connection to said control conductor at the conclusion of the selection impulse series corresponding thereto.

5. A system and circuit arrangement according to claim 1, wherein said marker lines include marker lines for selection impulse series which are not to be suppressed, such marker lines being at the conclusion of the corresponding impulse series connected in common with one of said selector start relay means to said control conductor, and further including marker lines corresponding to impulse series to be suppressed only once, said latter marker lines being at the conclusion of the corresponding impulse series connected to said control conductor and said one selector start relay being disconnected therefrom.

6. A system and circuit arrangement according to claim 5, comprising circuit means effective responsive to receipt of selection impulse series which are not to be suppressed for holding the other one of said selector start relays upon connection thereof to said control conductor energized by way of the corresponding marker lines in parallel to said control relay, said one selector start relay means being premagnetized in said circuit and being operatively energized subsequently by way of said control conductor to the potential connected thereto in said preceding selection impulse transmitting device.

7. A system and circuit arrangement according to claim 5, comprising means effective responsive to receipt of a selection impulse series which is to be suppressed only once for inhibiting operative actuation of said selector start relay means, receipt of any subsequent selection impulse series causing connection of potential to said control conductor for effecting operative actuation of said selector start relay means.

8. A system and circuit arrangement according to claim 1, comprising a switch for interconnecting said marker device with said selector, said switch comprising a switching member, and circuit means including said switching member for presettng desired combinations of selection impulse series which are to be respectively suppressed and not suppressed.

References Cited in the file of this patent

UNITED STATES PATENTS

| | | |
|---|---|---|
| 2,502,439 | Deakin | Apr. 4, 1950 |
| 2,696,525 | Deakin | Dec. 7, 1954 |
| 2,883,466 | Hutton | Apr. 21, 1959 |